United States Patent
Liu et al.

(10) Patent No.: US 11,400,368 B2
(45) Date of Patent: Aug. 2, 2022

(54) METHOD AND APPARATUS FOR CONTROLLING VIRTUAL OBJECT, AND STORAGE MEDIUM

(71) Applicant: TENCENT TECHNOLOGY (SHENZHEN) COMPANY LIMITED, Shenzhen (CN)

(72) Inventors: Jing Liu, Shenzhen (CN); Li Li, Shenzhen (CN); Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/148,553

(22) Filed: Jan. 13, 2021

(65) Prior Publication Data

US 2021/0129021 A1 May 6, 2021

Related U.S. Application Data

(63) Continuation of application No. 16/558,065, filed on Aug. 31, 2019, now Pat. No. 10,946,277, which is a
(Continued)

(30) Foreign Application Priority Data

Sep. 12, 2017 (CN) .......................... 201710817237.2

(51) Int. Cl.
*A63F 13/42* (2014.01)
*A63F 13/2145* (2014.01)
(Continued)

(52) U.S. Cl.
CPC .......... *A63F 13/42* (2014.09); *A63F 13/2145* (2014.09); *G06F 3/0488* (2013.01); *G06V 40/20* (2022.01)

(58) Field of Classification Search
CPC ..... G06F 3/0488; A63F 13/2145; A63F 13/42
See application file for complete search history.

(56) References Cited

U.S. PATENT DOCUMENTS

| 9,687,741 B1 | 6/2017 | Kim et al. |
| 10,606,470 B2 | 3/2020 | Ording |
| | (Continued) | |

FOREIGN PATENT DOCUMENTS

| CN | 104965655 A | 10/2015 |
| CN | 105251205 A | 1/2016 |
| | (Continued) | |

OTHER PUBLICATIONS

The Japan Patent Office (JPO) Notification of Reasons for Refusal for Application No. 2020-514997 and Translation dated Aug. 30, 2021 6 Pages.
(Continued)

*Primary Examiner* — Steve Rowland
(74) *Attorney, Agent, or Firm* — Anova Law Group, PLLC (57) ABSTRACT

The present disclosure provides a method for controlling a virtual object. The method includes: identifying screen areas corresponding to a left virtual sub-interface and a right virtual sub-interface in a virtual interface on a screen of the terminal device; detecting a gesture operation performed in the screen area corresponding to the left virtual sub-interface and detecting a gesture operation performed in the screen area corresponding to the right virtual sub-interface; and controlling a virtual object in the virtual interface to perform an action when a gesture operation is detected in the screen area corresponding to the left virtual sub-interface and the screen area corresponding to the right virtual sub-interface.

17 Claims, 8 Drawing Sheets

Related U.S. Application Data continuation of application No. PCT/CN2018/103174, filed on Aug. 30, 2018.

(51) Int. Cl.
*G06F 3/0488* (2022.01)
*G06V 40/20* (2022.01)

(56) References Cited

U.S. PATENT DOCUMENTS

| | | | | |
|---|---|---|---|---|
| 2008/0026842 A1* | 1/2008 | Nakasaka | ............... | A63F 13/10 463/37 |
| 2009/0143141 A1* | 6/2009 | Wells | ................. | G07F 17/3237 463/37 |
| 2010/0285881 A1* | 11/2010 | Bilow | ...................... | A63F 9/24 463/37 |
| 2011/0172013 A1* | 7/2011 | Shirasaka | ............... | A63F 13/92 463/37 |
| 2012/0311508 A1* | 12/2012 | Fleizach | ............... | G06F 3/0482 715/863 |
| 2013/0088437 A1* | 4/2013 | Nishidate | ................ | A63F 13/42 345/173 |
| 2013/0093690 A1* | 4/2013 | Papakipos | ............. | G06F 3/0488 345/173 |
| 2013/0167055 A1* | 6/2013 | Penev | ................... | G06F 3/0482 715/765 |
| 2013/0217498 A1 | 8/2013 | Wang | | |
| 2013/0257762 A1 | 10/2013 | Masuda | | |
| 2014/0285507 A1* | 9/2014 | Sato | .................... | G06F 3/04883 345/582 |
| 2014/0340324 A1* | 11/2014 | Xiao | ....................... | G06F 3/041 345/173 |
| 2014/0368260 A1* | 12/2014 | Tanada | ................ | G06F 3/04883 327/517 |
| 2015/0038231 A1* | 2/2015 | Mahlmeister | ......... | A63F 13/213 463/37 |
| 2015/0182856 A1* | 7/2015 | Mays, III | ................ | A63F 13/26 463/31 |
| 2015/0258430 A1* | 9/2015 | Alexeev | ............. | A63F 13/5375 463/36 |
| 2016/0051892 A1* | 2/2016 | Gao | ........................ | A63F 13/50 463/30 |
| 2016/0103541 A1* | 4/2016 | Andrews | ............. | G06F 3/04144 345/173 |
| 2016/0117075 A1* | 4/2016 | Stankovic | ............. | G06F 3/0412 345/173 |
| 2017/0123590 A1* | 5/2017 | Han | ....................... | G06F 3/0488 |
| 2017/0336905 A1* | 11/2017 | Palau | .................. | G06F 3/04812 |
| 2020/0014961 A1* | 1/2020 | Ramaswamy | ............................... | H04N 21/440263 |

FOREIGN PATENT DOCUMENTS

| | | | |
|---|---|---|---|
| CN | 105641927 | A | 6/2016 |
| CN | 105688409 | A | 6/2016 |
| CN | 105912162 | A | 8/2016 |
| CN | 106502563 | A | 3/2017 |
| CN | 107132981 | A | 9/2017 |
| JP | 2008071096 | A | 3/2008 |
| JP | 201029711 | A | 2/2010 |
| JP | 2010515978 | A | 5/2010 |
| JP | 2012234331 | A | 11/2012 |
| JP | 2013229854 | A | 11/2013 |
| JP | 2016076017 | A | 5/2016 |
| JP | 6097427 | B1 | 3/2017 |
| JP | 2017153949 | A | 9/2017 |

OTHER PUBLICATIONS

The European Patent Office (EPO) The Extended European Search Report for 18857311.7 dated May 12, 2020 9 Pages.
Korean Intellectual Property Office (KIPO) Office Action 1 for 20197031185 dated Oct. 21, 2020 12 Pages (including translation).
The World Intellectual Property Organization (WIPO) International Search Report for PCT/CN2018/103174 dated Oct. 31, 2018 6 Pages (including translation).
The State Intellectual Property Office of the People's Republic of China (SIPO) Office Action 1 for 201710817237. 2, dayed Jan. 28, 2021 19 Pages (including translation).
The Japan Patent Office (JPO) Notification of Reasons for Refusal for Application No. 2020-514997 and Translation dated Mar. 29, 2021 8 Pages (including translation).

\* cited by examiner

METHOD AND APPARATUS FOR CONTROLLING VIRTUAL OBJECT, AND STORAGE MEDIUM

RELATED APPLICATION

This application is a continuation application of U.S. patent application Ser. No. 16/558,065, filed on Aug. 31, 2019, which in turn claims priority to PCT Application No. PCT/CN2018/103174, filed on Aug. 30, 2018, which in turn claims priority to Chinese Patent Application No. 201710817237.2, entitled "METHOD AND APPARATUS FOR CONTROLLING VIRTUAL OBJECT, AND STORAGE MEDIUM" filed with the National Intellectual Property Administration, PRC on Sep. 12, 2017, all of which are incorporated herein by reference in their entirety.

FIELD OF THE TECHNOLOGY

This application relates to the field of mobile terminal technologies, and in particular to a method and an apparatus for controlling a virtual object, and a storage medium thereof.

BACKGROUND OF THE DISCLOSURE

With the development of network and terminal technologies, various mobile games are fast developing. Mobile games are game software applications run on mobile phones. Among the mobile games, the racing games are classics.

SUMMARY

The present disclosure provides a method for controlling a virtual object. The method includes: identifying screen areas corresponding to a left virtual sub-interface and a right virtual sub-interface in a virtual interface on a screen of the terminal device; detecting a gesture operation performed in the screen area corresponding to the left virtual sub-interface and detecting a gesture operation performed in the screen area corresponding to the right virtual sub-interface; and controlling a virtual object in the virtual interface to perform an action when a gesture operation is detected in the screen area corresponding to the left virtual sub-interface and the screen area corresponding to the right virtual sub-interface.

Another aspect of the present disclosure provides an apparatus for controlling a virtual object. The apparatus includes a processor and a memory. The memory stores a computer-readable instruction that is capable of causing the processor to: identify screen areas respectively corresponding to a left virtual sub-interface and a right virtual sub-interface in a virtual interface on a screen of the terminal device; detect a gesture operation performed in the screen area corresponding to the left virtual sub-interface and detect a gesture operation performed in the screen area corresponding to the right virtual sub-interface; and control a virtual object in the virtual interface to perform an action when a gesture operation is detected in the screen area corresponding to the left virtual sub-interface and the screen area corresponding to the right virtual sub-interface.

Another aspect of the present disclosure provides a display device. The display device includes a computer-readable storage medium, storing a computer-readable instruction, when executed by a processor, the computer readable instruction causing the processor to perform a method for controlling a virtual object. The method includes identifying screen areas corresponding to a left virtual sub-interface and a right virtual sub-interface in a virtual interface on a screen of the terminal device; detecting a gesture operation performed in the screen area corresponding to the left virtual sub-interface and detecting a gesture operation performed in the screen area corresponding to the right virtual sub-interface; and controlling a virtual object in the virtual interface to perform an action when a gesture operation is detected in the screen area corresponding to the left virtual sub-interface and the screen area corresponding to the right virtual sub-interface.

BRIEF DESCRIPTION OF THE DRAWINGS

To describe the technical solutions in the embodiments of this application or in the related technology more clearly, the following briefly introduces the accompanying drawings required for describing the examples or the related technology. Apparently, the accompanying drawings in the following description show merely some examples of this application, and a person of ordinary skill in the art may still derive other drawings from these accompanying drawings without creative efforts.

DESCRIPTION OF EMBODIMENTS

To make the invention objectives, features, and advantages of this application clearer and more comprehensible, the following clearly and completely describes the technical solutions in the examples of this application with reference to the accompanying drawings in the examples of this application. Apparently, the examples described are merely a part rather than all of the examples of this application. All other examples obtained by a person of ordinary skill in the art based on the examples of this application without creative efforts shall fall within the protection scope of this application.

Figure 1A:
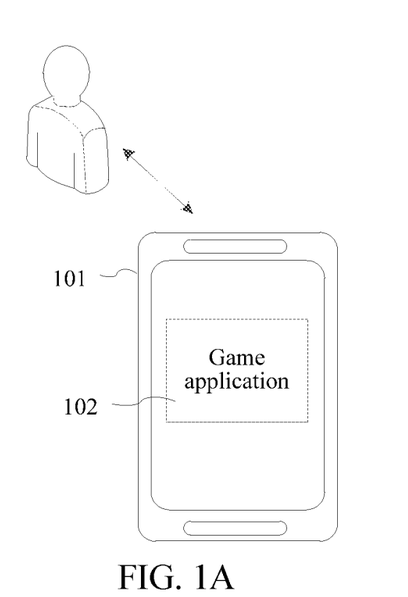
FIG. 1A is a schematic architectural diagram of a system according to an example of this application.

A use scenario in the following examples of this application is that a game application 102 is run on a terminal device, such as a mobile terminal 101. Further, the use scenario may be that a racing game application is run in the mobile terminal 101. In a game picture displayed on a screen when an application is run, a simple preset gesture operation is separately performed on a left virtual sub-interface and a right virtual sub-interface in the virtual interface, to accurately complete movement operations, such as drifting and turning. However, examples of this application are not limited to a racing game. All games that needs to trigger lateral sliding in game running fall within the protection scope of the examples of this application. See the following examples for descriptions of specific technical solutions.

Directions and locations in the examples of this application are confirmed according to a central point of the virtual interface. Specifically, using the central point of the virtual interface as a coordinate origin, a rectangular plane coordinate system is established. A virtual interface corresponding to a first quadrant and a fourth quadrant of the rectangular plane coordinate system is a right virtual sub-interface, and a virtual interface corresponding to a second quadrant and a third quadrant is a left virtual sub-interface. Upward sliding is positive-direction sliding along a y axis, downward sliding is negative-direction sliding along the y axis, rightward sliding is positive-direction sliding along an x axis, and leftward sliding is negative-direction sliding along the x axis.

Figure 1B:
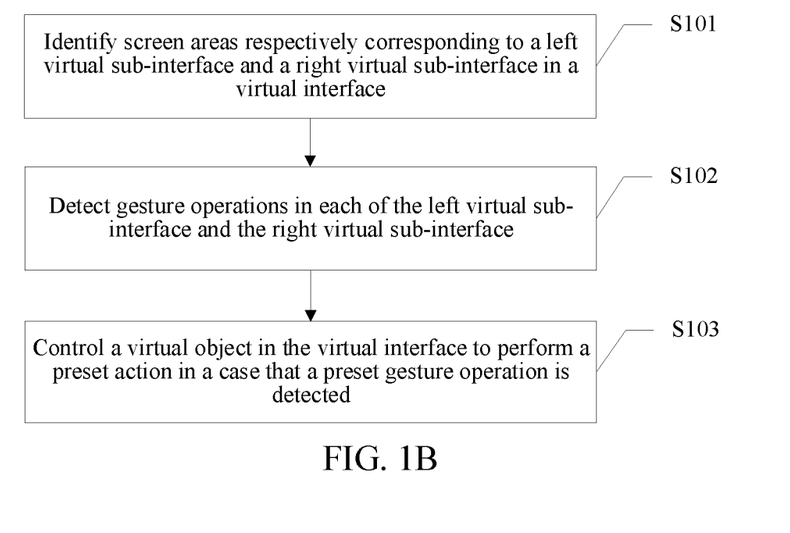
FIG. 1B is a schematic flowchart of a method for controlling a virtual object according to an example of this application.

Referring to FIG. 1B, FIG. 1B is a schematic flowchart of a method for controlling a virtual object according to an example of this application. The method for controlling a virtual object may be applied to a mobile terminal having a touch screen. The mobile terminal may include a mobile phone, a tablet computer, a handheld game console, and the like. In one embodiment consistent with the present disclosure, an example in which an application is a racing game is used for description. The method includes:

S101: Identify screen areas respectively corresponding to a left virtual sub-interface and a right virtual sub-interface in a virtual interface.

When an application of a racing game is run, parameter information of screen areas of a mobile terminal respectively corresponding to the left virtual sub-interface and the right virtual sub-interface in the virtual interface is loaded, to obtain the screen areas respectively corresponding to the left virtual sub-interface and the right virtual sub-interface.

Figure 2:
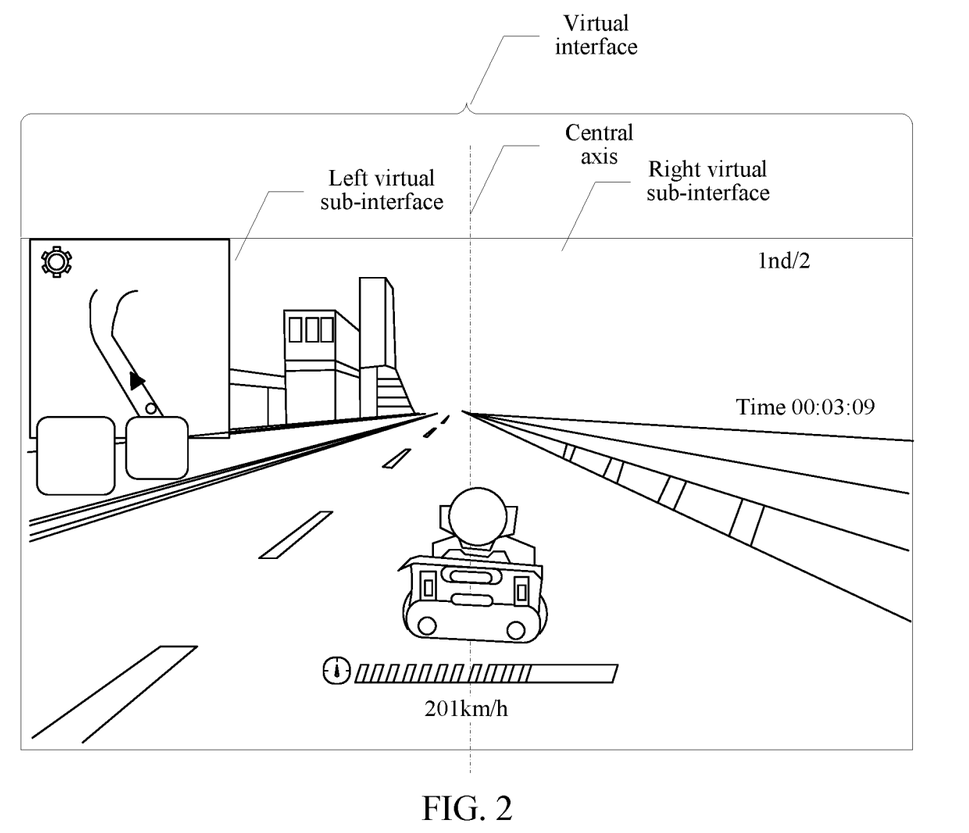
FIG. 2 is a schematic diagram of a virtual interface according to an example of this application.

As shown in FIG. 2, the virtual interface is a game picture displayed on the screen when the racing game is run. Using a central axis of the screen that a user faces when playing a game as a boundary, the virtual interface is divided into two virtual sub-interfaces: a left one and a right one, that is, a left virtual sub-interface and a right virtual sub-interface. The central axis of the screen may be a horizontal central axis or may be a longitudinal central axis, depending on whether the user requires landscape or portrait when playing a game.

S102: Detect gesture operations in each of the left virtual sub-interface and the right virtual sub-interface.

Specifically, a gesture operation performed in the screen area corresponding to the left virtual sub-interface is detected, and a gesture operation performed in the screen area corresponding to the right virtual sub-interface is detected.

S103: Control a virtual object in the virtual interface to perform a preset action when a preset gesture operation is detected.

A virtual object in the virtual interface is controlled to perform a preset action when a preset gesture operation is detected in the screen area corresponding to the left virtual sub-interface and the screen area corresponding to the right virtual sub-interface.

The virtual object is an object for performing the preset action in the game. For example, the virtual object is a racing car in a picture.

The preset action may be a drift action of the virtual object or a turning action of the virtual object. The drift action means that the virtual object skids and walks due to excessive turning.

The preset gesture operation may be a preset press gesture, slide gesture, or the like.

In one embodiment consistent with the present disclosure, the virtual interface is divided into the left virtual sub-interface and the right virtual sub-interface; gesture operations performed in the screen areas corresponding to the left virtual sub-interface and the right virtual sub-interface are detected; when the preset gesture operation is detected, the virtual object in the virtual interface is controlled to perform the preset action, to quickly and accurately control the virtual object at low operation costs and lower a probability of a mis-operation caused by a direction error of a click-press operation because a fault tolerance range of operations is large.

Figure 3:
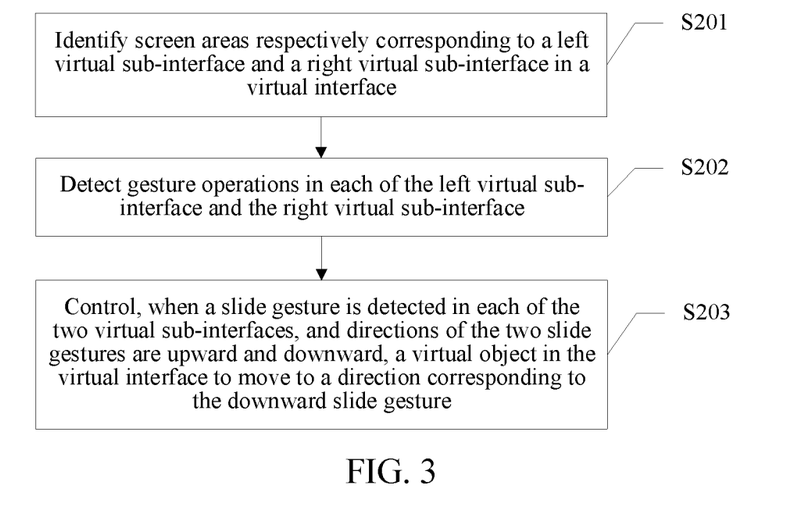
FIG. 3 is a schematic flowchart of a method for controlling a virtual object according to an example of this application.

Referring to FIG. 3, FIG. 3 shows a method for controlling a virtual object according to an example of this application. The method may be applied to a mobile terminal and includes:

S201: Identify screen areas respectively corresponding to a left virtual sub-interface and a right virtual sub-interface in a virtual interface.

When an application of a racing game is run, parameter information of screen areas of a mobile terminal respectively corresponding to the left virtual sub-interface and the right virtual sub-interface in the virtual interface is loaded, to obtain the screen areas respectively corresponding to the left virtual sub-interface and the right virtual sub-interface.

The virtual interface is a game picture displayed on the screen when the racing game is run. Using a central axis of the screen that a user faces when playing a game as a boundary, the virtual interface is divided into two virtual sub-interfaces: a left one and a right one, that is, a left virtual sub-interface and a right virtual sub-interface.

S202: Detect gesture operations in each of the left virtual sub-interface and the right virtual sub-interface.

Specifically, a gesture operation performed in the screen area corresponding to the left virtual sub-interface is detected, and a gesture operation performed in the screen area corresponding to the right virtual sub-interface is detected.

S203: Control, when a slide gesture is detected in each of the two virtual sub-interfaces, and directions of the two slide gestures are upward and downward, a virtual object in the virtual interface to move to a direction in which the downward slide gesture is located.

The virtual object in the virtual interface is controlled to move when an upward or downward slide gesture is detected in the screen area corresponding to the left virtual sub-interface, and a downward or upward slide gesture that reverse to the gesture is detected in the screen area corresponding to the right virtual sub-interface, a movement direction being a direction of a virtual sub-interface in which the downward slide gesture is located. Specifically, in one embodiment, the direction in which the downward slide gesture is located is the left virtual sub-interface, the virtual object in the virtual interface is controlled to move to the left. In one embodiment, the direction in which the downward slide gesture is located is the right virtual sub-interface, the virtual object in the virtual interface is controlled to move to the right.

Specifically, movement may be drift. In one embodiment, the downward slide gesture is detected in the screen area corresponding to the left virtual sub-interface, and the upward slide gesture is detected in the screen area corresponding to the right virtual sub-interface, the virtual object in the virtual interface is controlled to drift to the left, as shown in FIG. 4.

Figure 5:
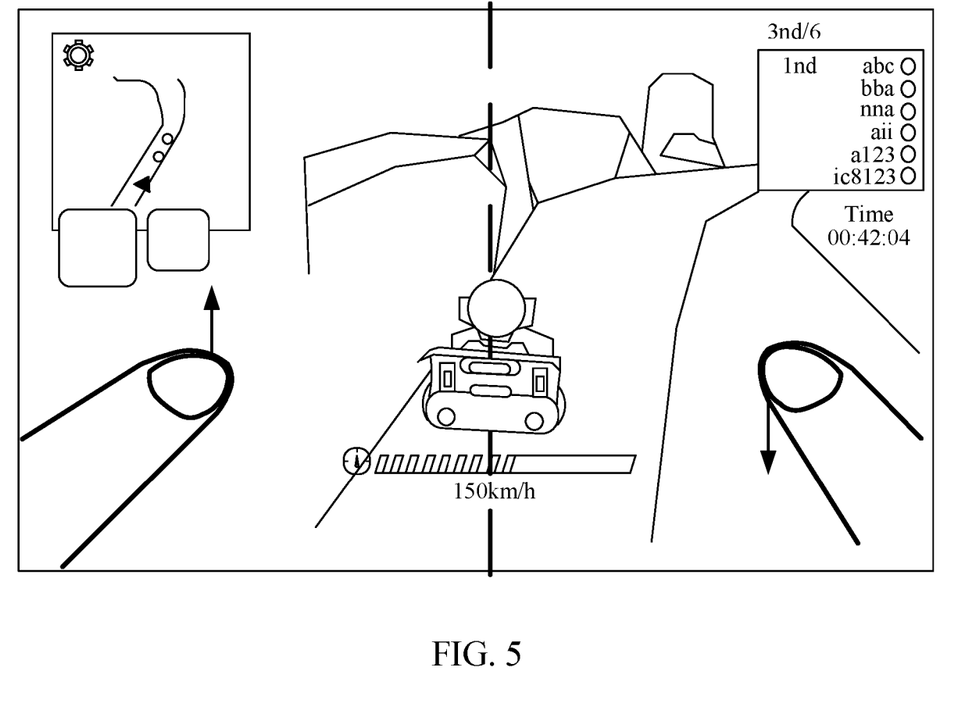
FIG. 5 is a schematic diagram of controlling, through a downward slide gesture of a right hand and an upward slide gesture of a left hand, a virtual object to drift to the right according to an example of this application.

In one embodiment, the upward slide gesture is detected in the screen area corresponding to the left virtual sub-interface, and the downward slide gesture is detected in the screen area corresponding to the right virtual sub-interface, the virtual object in the virtual interface is controlled to drift to the right, as shown in FIG. 5.

The downward slide gesture and the upward slide gesture may be detected at the same time or may be detected at an interval of a preset duration, such as an interval of 0.5 s.

Figure 4:
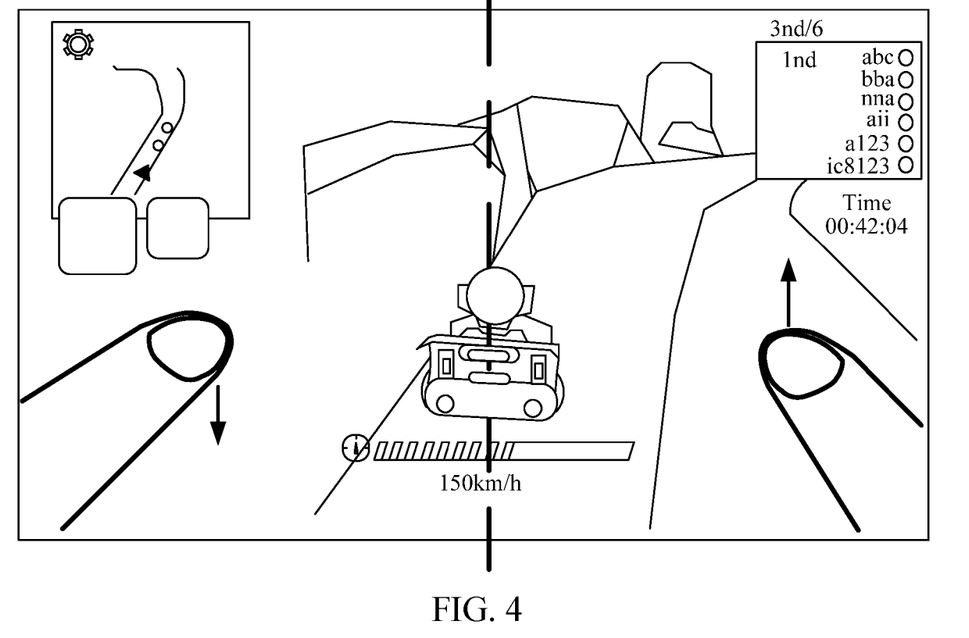
FIG. 4 is a schematic diagram of controlling, through a downward slide gesture of a left hand and an upward slide gesture of a right hand, a virtual object to drift to the left according to an example of this application.

With reference to FIG. 4, a gesture slide direction of a left hand is downward, and a gesture slide direction of a right hand is upward. With reference to FIG. 5, a gesture slide direction of a left hand is upward, and a gesture slide direction of a right hand is downward.

In one embodiment consistent with the present disclosure, the virtual interface is divided into the left virtual sub-interface and the right virtual sub-interface; the gesture operations performed in the screen areas corresponding to the left virtual sub-interface and the right virtual sub-interface are detected; when an upward or downward slide gesture is detected in the screen area corresponding to the left virtual sub-interface, and a downward or upward slide gesture that reverse to the gesture is detected in the screen area corresponding to the right virtual sub-interface, the virtual object in the virtual interface is controlled to move. An operation of a steering wheel is stimulated through the slide gesture, to improve user experience, and the opposite slide gesture is performed by two hands, to quickly and accurately control the virtual object and lower a probability of a mis-operation caused by a direction error of a click-press operation.

Figure 6:
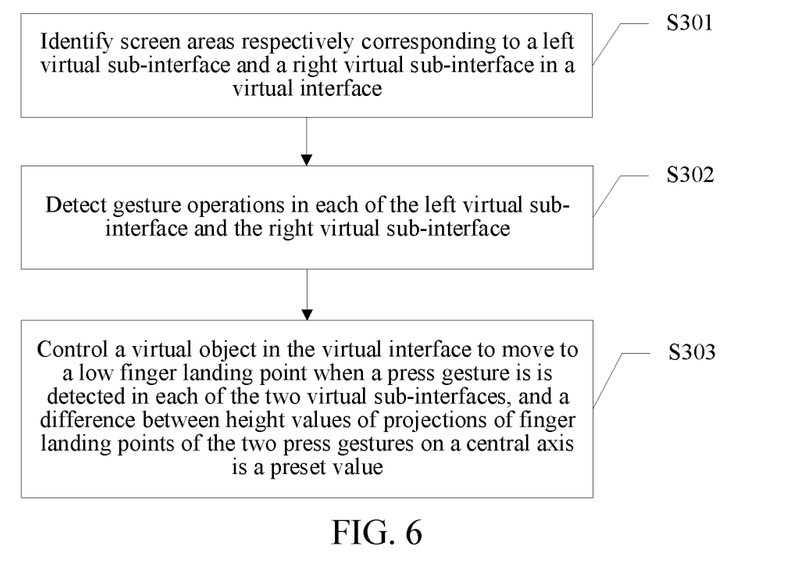
FIG. 6 is a schematic flowchart of a method for controlling a virtual object according to an example of this application.

Referring to FIG. 6, FIG. 6 shows a method for controlling a virtual object according to an example of this application. The method may be applied to a mobile terminal and includes:

S301: Identify screen areas respectively corresponding to a left virtual sub-interface and a right virtual sub-interface in a virtual interface.

When an application of a racing game is run, parameter information of screen areas of a mobile terminal respectively corresponding to the left virtual sub-interface and the right virtual sub-interface in the virtual interface is loaded, to obtain the screen areas respectively corresponding to the left virtual sub-interface and the right virtual sub-interface.

The virtual interface is a game picture displayed on the screen when the racing game is run. Using a central axis of the screen that a user faces when playing a game as a boundary, the virtual interface is divided into two virtual sub-interfaces: a left one and a right one, that is, a left virtual sub-interface and a right virtual sub-interface.

S302: Detect gesture operations in each of the left virtual sub-interface and the right virtual sub-interface.

Specifically, a gesture operation performed in the screen area corresponding to the left virtual sub-interface is detected, and a gesture operation performed in the screen area corresponding to the right virtual sub-interface is detected.

S303: Control a virtual object in the virtual interface to move to a low finger landing point when a press gesture is detected in each of the two virtual sub-interfaces, and a difference between height values of projections of finger landing points of the two press gestures on a central axis is greater than a first preset value.

Specifically, when a first press gesture and a second press gesture are detected in each of the screen area corresponding to the left virtual sub-interface and the screen area corresponding to the right virtual sub-interface, a first finger landing point, that is, a pressing area of a finger, of the first press gesture on the screen of the mobile terminal and a second finger landing point of the second press gesture on the screen are confirmed according to the screen areas respectively corresponding to the left virtual sub-interface and the right virtual sub-interface.

Figure 7:
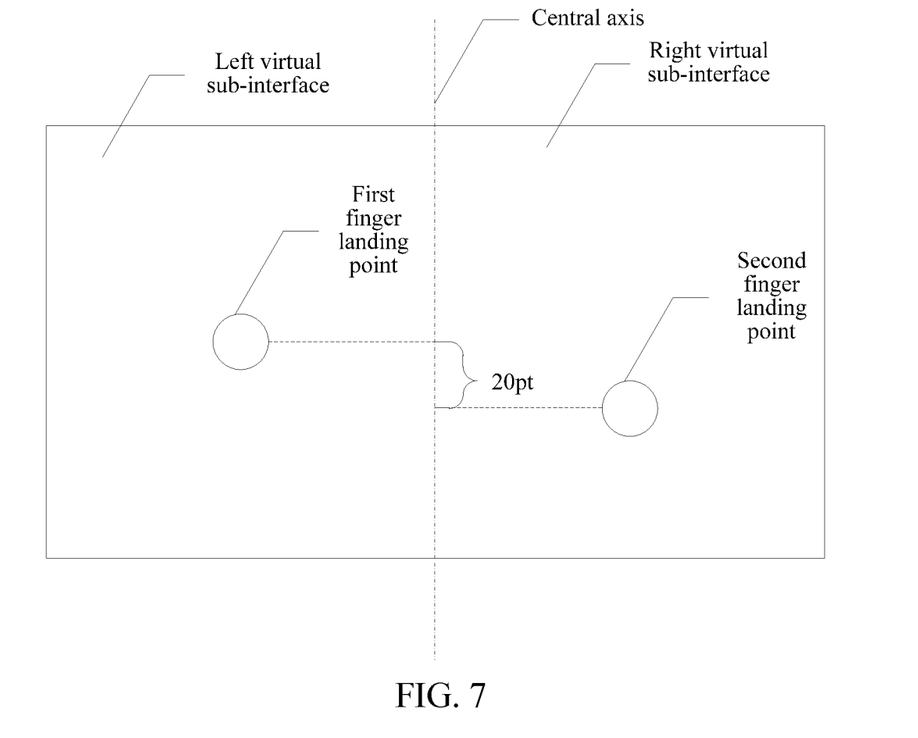
FIG. 7 is a schematic diagram of a virtual interface in which a height of a projection of a first finger landing point on a central axis is higher than a height of a projection of a second finger landing point on a central axis according to an example of this application.
Figure 8:
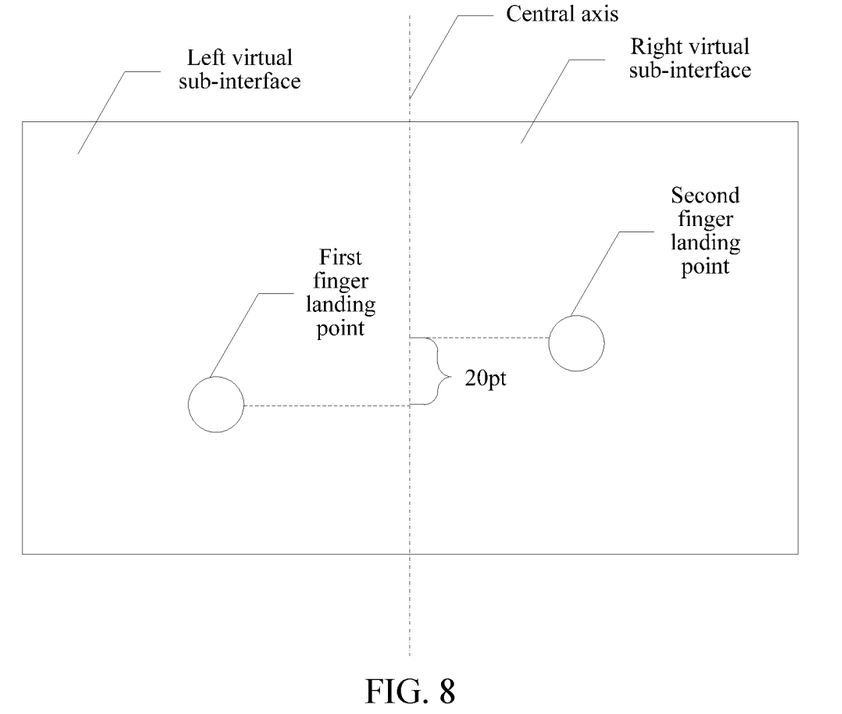
FIG. 8 is a schematic diagram of a virtual interface in which a height of a projection of a first finger landing point on a central axis is lower than a height of a projection of a second finger landing point on a central axis according to an example of this application.

A first height of a projection of the first finger landing point on the central axis of the screen and a second height of a projection of the second finger landing point on the central axis of the screen are obtained. In one embodiment, a difference between the first height and the second height is greater than the first preset value, the first preset value may be 20 pixels or other preset pixels, such as 15 pixels or 25 pixels. Therefore, the virtual object in the virtual interface is controlled to move. In one embodiment, the first height is greater than the second height, the virtual object in the virtual interface is controlled to move to the right, as shown in FIG. 7. In one embodiment, the second height is greater than the first height, the virtual object in the virtual interface is controlled to move to the left, as shown in FIG. 8.

That is, the virtual object is controlled to move to a direction corresponding to a finger landing point with a smaller height value in two height values formed by respective projections of the first finger landing point and the second finger landing point on the central axis.

In one embodiment consistent with the present disclosure, the virtual interface is divided into the left virtual sub-interface and the right virtual sub-interface; the gesture operations performed in the screen areas corresponding to the left virtual sub-interface and the right virtual sub-interface are detected; when a press gesture is detected in each of the screen areas corresponding to the left virtual sub-interface and the right virtual sub-interface, and a difference between height values of projections of finger landing points of the two press gestures on the central axis is greater than the first preset value, the virtual object in the virtual interface is controlled to move. Press gestures at different locations and at different heights are performed by two hands, to quickly and accurately control the virtual object and lower a probability of a mis-operation caused by a direction error of a click-press operation.

Figure 9:
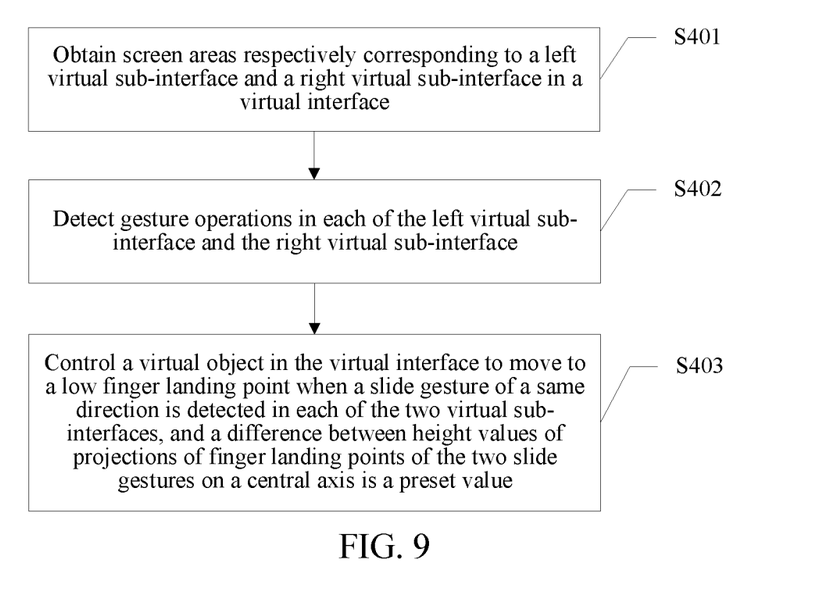
FIG. 9 is a schematic flowchart of a method for controlling a virtual object according to an example of this application.

Referring to FIG. 9, FIG. 9 shows a method for controlling a virtual object according to an example of this application. The method may be applied to a mobile terminal and includes:

S401: Identify screen areas respectively corresponding to a left virtual sub-interface and a right virtual sub-interface in a virtual interface.

When an application of a racing game is run, parameter information of screen areas of a mobile terminal respectively corresponding to the left virtual sub-interface and the right virtual sub-interface in the virtual interface is loaded, to obtain the screen areas respectively corresponding to the left virtual sub-interface and the right virtual sub-interface.

The virtual interface is a game picture displayed on the screen when the racing game is run. Using a central axis of the screen that a user faces when playing a game as a boundary, the virtual interface is divided into two virtual sub-interfaces: a left one and a right one, that is, a left virtual sub-interface and a right virtual sub-interface.

S402: Detect gesture operations in each of the left virtual sub-interface and the right virtual sub-interface.

Specifically, a gesture operation performed in the screen area corresponding to the left virtual sub-interface is detected, and a gesture operation performed in the screen area corresponding to the right virtual sub-interface is detected.

S403: Control a virtual object in the virtual interface to move to a low finger landing point when a slide gesture of a same direction is detected in each of the two virtual sub-interfaces, and a difference between height values of projections of finger landing points corresponding to start points of the two slide gestures on the screen on the central axis is greater than a second preset value.

In one embodiment, a first slide gesture and a second slide gesture that both indicate upward sliding or downward sliding are detected in each of the screen area corresponding to the left virtual sub-interface and the screen area corresponding to the right virtual sub-interface, a first finger landing point corresponding to a start point of the first slide gesture on the screen and a second finger landing point corresponding to a start point of the second slide gesture on the screen are confirmed.

The second preset value may be 20 pixels, or other preset pixels, such as 15 pixels or 25 pixels.

Further, the virtual object in the virtual interface is controlled to move according to a height difference between respective projections of the first finger landing point and the second finger landing point on the central axis of the screen. Specifically, a first height of a projection of the first finger landing point on the central axis of the screen and a second height of a projection of the second finger landing point on the central axis of the screen are obtained. In one embodiment, a difference between the first height and the second height is greater than the second preset value, the virtual object in the virtual interface is controlled to move. In one embodiment, the first height is greater than the second height, the virtual object in the virtual interface is controlled to move to the right, referring to FIG. 7. In one embodiment, the second height is greater than the first height, the virtual object in the virtual interface is controlled to move to the left, referring to FIG. 8. In one embodiment, the difference between the first height and the second height is less than or equal to the second preset value, the virtual object may not be triggered to move, and a current action continues to be performed.

In one embodiment consistent with the present disclosure, the virtual interface is divided into the left virtual sub-interface and the right virtual sub-interface; the gesture operations performed in the screen areas corresponding to the left virtual sub-interface and the right virtual sub-interface are detected; when a slide gesture of a same direction is detected in each of the screen areas corresponding to the left virtual sub-interface and the right virtual sub-interface, and a difference between height values of projections of finger landing points corresponding to start points of the two slide gestures on the screen on the central axis is greater than the second preset value, the virtual object in the virtual interface is controlled to move. Slide gestures of the same direction at different locations and at different heights are performed by two hands, to quickly and accurately control the virtual object and lower a probability of a mis-operation caused by a direction error of a click-press operation.

Figure 10:
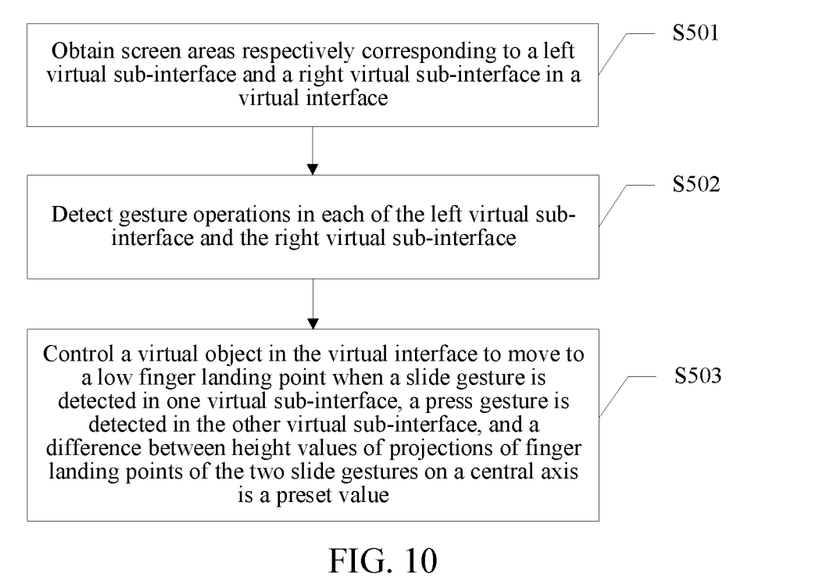
FIG. 10 is a schematic flowchart of a method for controlling a virtual object according to an example of this application.

Referring to FIG. 10, FIG. 10 shows a method for controlling a virtual object according to an example of this application. The method may be applied to a mobile terminal and includes:

S501: Identify screen areas respectively corresponding to a left virtual sub-interface and a right virtual sub-interface in a virtual interface.

When an application of a racing game is run, parameter information of screen areas of a mobile terminal respectively corresponding to the left virtual sub-interface and the right virtual sub-interface in the virtual interface is loaded, to obtain the screen areas respectively corresponding to the left virtual sub-interface and the right virtual sub-interface.

The virtual interface is a game picture displayed on the screen when the racing game is run. Using a central axis of the screen that a user faces when playing a game as a boundary, the virtual interface is divided into two virtual sub-interfaces: a left one and a right one, that is, a left virtual sub-interface and a right virtual sub-interface.

S502: Detect gesture operations in each of the left virtual sub-interface and the right virtual sub-interface.

Specifically, a gesture operation performed in the screen area corresponding to the left virtual sub-interface is detected, and a gesture operation performed in the screen area corresponding to the right virtual sub-interface is detected.

S503: Control the virtual object in the virtual interface to move to a low finger landing point when a slide gesture is detected in one virtual sub-interface, a press gesture is detected in the other virtual sub-interface, and a difference between height values of projections of a finger landing point corresponding to a start point of the slide gesture on the screen and a finger landing point of the press gesture on a central axis is greater than a third preset value.

Specifically, when an upward or downward slide gesture is detected in the left virtual sub-interface, and a press gesture is detected in the right virtual sub-interface, or a downward or upward slide gesture is detected in the right virtual sub-interface, and a press gesture is detected in the left virtual sub-interface, the first finger landing point corresponding to a start point of the slide gesture on the screen and the second finger landing point of the press gesture on the screen are confirmed.

The virtual object in the virtual interface is controlled to move according to a height difference between respective projections of the first finger landing point and the second finger landing point on the central axis of the screen. Specifically, a first height of a projection of the first finger landing point on the central axis of the screen and a second height of a projection of the second finger landing point on the central axis of the screen are obtained. In one embodiment, a difference between the first height and the second height is greater than the third preset value, the virtual object in the virtual interface is controlled to move. In one embodiment, the first height is greater than the second height, the virtual object is controlled to move to an opposite side of a virtual sub-interface in which the slide gesture is located. In one embodiment, the second height is greater than the first height, the virtual object is controlled to move to the virtual sub-interface in which the slide gesture is located. In one embodiment, the difference between the first height and the second height is less than or equal to the third preset value, the virtual object may not be triggered to move, and a current action continues to be performed.

The third preset value may be 20 pixels, or other preset pixels, such as 15 pixels or 25 pixels.

More specifically, in this example, when the preset gesture operations are detected in the left virtual sub-interface and the right virtual sub-interface, the virtual object in the virtual interface is controlled to perform a preset action, including the following four situations:

First situation: an upward slide gesture is detected in the left virtual sub-interface, and a press gesture is detected in the right virtual sub-interface.

The first finger landing point corresponding to the start point of the slide gesture on the screen is confirmed, and the second finger landing point of the press gesture on the screen is confirmed. The first height of the projection of the first finger landing point on the central axis of the screen is obtained, and the second height of the projection of the second finger landing point on the central axis of the screen is obtained.

In one embodiment, the difference between the first height and the second height is greater than the third preset value, the virtual object in the virtual interface is controlled to move, and the first height is greater than the second height. Therefore, the virtual object is controlled to move to the opposite side of the virtual sub-interface in which the slide gesture is located, that is, move to an opposite side of the left virtual sub-interface, that is, move to the right. In one embodiment, the difference between the first height and the second height is less than or equal to the preset value, the virtual object may not be triggered to move, and a current action continues to be performed.

Second situation: a downward slide gesture is detected in the left virtual sub-interface, and a press gesture is detected in the right virtual sub-interface.

The first finger landing point corresponding to the start point of the slide gesture on the screen is confirmed, and the second finger landing point of the press gesture on the screen is confirmed. The first height of the projection of the first finger landing point on the central axis of the screen is obtained, and the second height of the projection of the second finger landing point on the central axis of the screen is obtained.

In one embodiment, the difference between the first height and the second height is greater than the third preset value, the virtual object in the virtual interface is controlled to move, and the second height is greater than the first height. Therefore, the virtual object is controlled to move to the virtual sub-interface in which the slide gesture is located, that is, move to the left virtual sub-interface, that is, move to the left.

In one embodiment, the difference between the first height and the second height is less than or equal to the third preset value, the virtual object may not be triggered to move, and a current action continues to be performed.

Third situation: an upward slide gesture is detected in the right virtual sub-interface, and a press gesture is detected in the left virtual sub-interface.

The first finger landing point corresponding to the start point of the slide gesture on the screen is confirmed, and the second finger landing point of the press gesture on the screen is confirmed. The first height of the projection of the first finger landing point on the central axis of the screen is obtained, and the second height of the projection of the second finger landing point on the central axis of the screen is obtained.

In one embodiment, the difference between the first height and the second height is greater than the third preset value, the virtual object in the virtual interface is controlled to move, and the first height is greater than the second height. Therefore, the virtual object is controlled to move to the opposite side of the virtual sub-interface in which the slide gesture is located. That is, the virtual object is controlled to move to an opposite side of the right virtual sub-interface, that is, move to the left.

In one embodiment, the difference between the first height and the second height is less than or equal to the third preset value, the virtual object may not be triggered to move, and a current action continues to be performed.

Fourth situation: a downward slide gesture is detected in the right virtual sub-interface, and a press gesture is detected in the left virtual sub-interface.

The first finger landing point corresponding to the start point of the slide gesture on the screen is confirmed, and the second finger landing point of the press gesture on the screen is confirmed. The first height of the projection of the first finger landing point on the central axis of the screen is obtained, and the second height of the projection of the second finger landing point on the central axis of the screen is obtained.

In one embodiment, the difference between the first height and the second height is greater than the third preset value, the virtual object in the virtual interface is controlled to move, and the second height is greater than the first height. Therefore, the virtual object is controlled to move to the virtual sub-interface in which the slide gesture is located. That is, the virtual object is controlled to move to the right virtual sub-interface, that is, move to the right.

In one embodiment, the difference between the first height and the second height is less than or equal to the third preset value, the virtual object may not be triggered to move, and a current action continues to be performed.

The slide gesture and the press gesture may be detected at the same time or detected at an interval of preset duration. When the press gesture or another preset gesture is not detected beyond the preset duration, it is considered that the user operates a game with one hand. Therefore, the virtual object is triggered, according to the detected upward or downward slide gesture, to be controlled to move, and a movement direction is a direction of a virtual sub-interface in which the downward slide gesture is located or a direction of a virtual sub-interface of an opposite side of the upward slide gesture. For example, the preset duration is 1 s. The upward slide gesture is detected in the right virtual sub-interface, while the press gesture or the preset slide gesture (that is, the upward or downward slide gesture) is not detected in the left virtual sub-interface within 1 s. Therefore, the virtual object is controlled to move to the left. For another example, the preset duration is 0.5 s. The downward slide gesture is detected in the left virtual sub-interface, while the press gesture or the slide gesture is not detected in the right virtual sub-interface within 0.5 s. Therefore, the virtual object is controlled to move to the left.

In one embodiment consistent with the present disclosure, the virtual interface is divided into the left virtual sub-interface and the right virtual sub-interface; the gesture operations performed in the screen areas corresponding to the left virtual sub-interface and the right virtual sub-interface are detected; In one embodiment, a press gesture and a pressure gesture are respectively detected in the screen areas corresponding to the left virtual sub-interface and the right virtual sub-interface, and a difference between height values of projections of finger landing points of the slide gesture and the press gesture on the central axis is greater than the third preset value, the virtual object in the virtual interface is controlled to move. The slide gesture and the press gesture at different locations and at different heights are performed by two hands, to quickly and accurately control the virtual object and lower a probability of a mis-operation caused by a direction error of a click-press operation.

Figure 11:
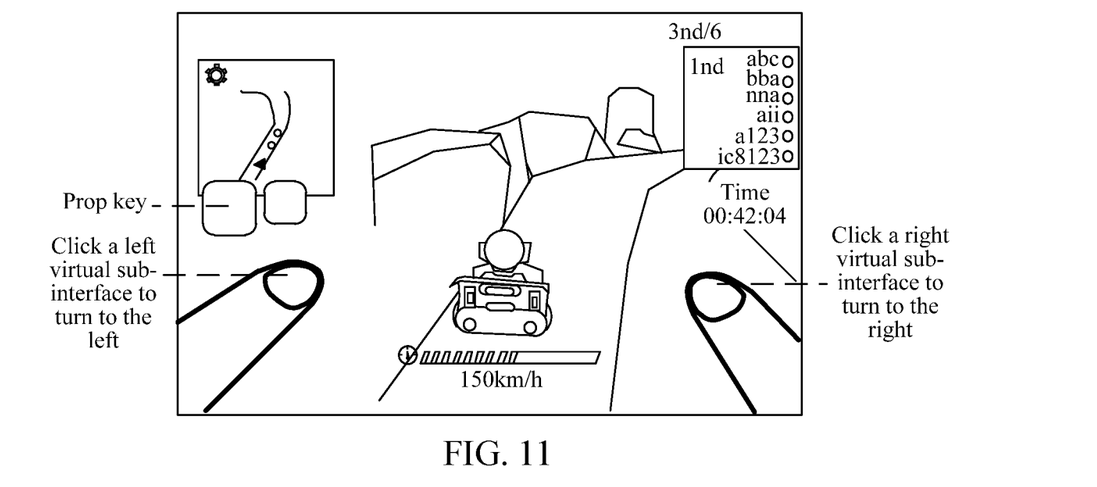
FIG. 11 is a schematic diagram of a virtual interface for controlling a virtual object to turn according to an example of this application.

Further, dividing the virtual interface into the left virtual sub-interface and the right virtual sub-interface and detecting the gesture operations performed in the screen areas corresponding to the left virtual sub-interface and the right virtual sub-interface may also be detecting a click (or a click-press) operation. Very concisely, when a click operation on the screen corresponding to the left virtual sub-interface is detected, the virtual object is controlled to turn to the left. In one embodiment, a click operation on the screen corresponding to the right virtual sub-interface is detected, the virtual object is controlled to turn to the right, as shown in FIG. 11. In addition, when a click operation on a screen area corresponding to a prop key in the left virtual sub-interface is detected, a prop function corresponding to the prop key is performed. A simple click operation is performed on the left virtual sub-interface and the right virtual sub-interface by two hands, to quickly and accurately control the virtual object to turn.

Figure 12:
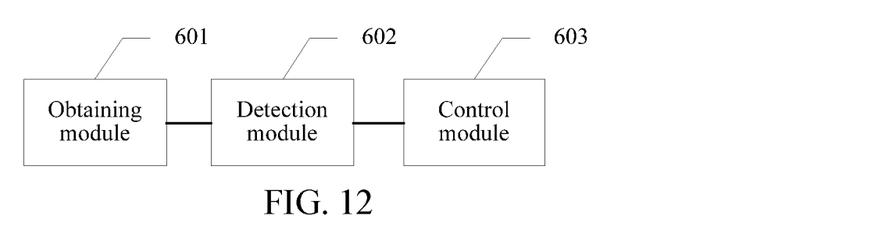
FIG. 12 is a schematic structural diagram of an apparatus for controlling a virtual object according to an example of this application.

Referring to FIG. 12, FIG. 12 shows an apparatus for controlling a virtual object according to an example of this application. For ease of description, only parts related to this example of this application are shown. The apparatus may be built in a mobile terminal and includes: an obtaining module 601, a detection module 602, and a control module 603.

The obtaining module 601 is configured to identify screen areas respectively corresponding to a left virtual sub-interface and a right virtual sub-interface in a virtual interface.

When an application of a racing game is run, parameter information of screen areas of a mobile terminal respectively corresponding to the left virtual sub-interface and the right virtual sub-interface in the virtual interface is loaded, so that the obtaining module 601 obtains the screen areas respectively corresponding to the left virtual sub-interface and the right virtual sub-interface.

The detection module 602 is configured to detect a gesture operation performed in the screen area corresponding to the left virtual sub-interface, and detect a gesture operation performed in the screen area corresponding to the right virtual sub-interface.

The control module 603 is configured to control a virtual object in the virtual interface to perform a preset action when a preset gesture operation is detected in the screen area corresponding to the left virtual sub-interface and the screen area corresponding to the right virtual sub-interface.

The virtual object is an object for performing the preset action in the game. For example, the virtual object is a racing car in a picture.

The preset action may be a movement action of the virtual object or a turning action of the virtual object. The movement action means that the virtual object skids and walks due to excessive turning.

The preset gesture operation may be a preset press gesture, slide gesture, or the like.

The apparatus in this example of this application is configured to perform the method in the foregoing example shown in FIG. 1B. Technical details that are not described are the same as those in the example shown in FIG. 1B details are not described herein again.

In one embodiment consistent with the present disclosure, the virtual interface is divided into the left virtual sub-interface and the right virtual sub-interface; gesture operations performed in the screen areas corresponding to the left virtual sub-interface and the right virtual sub-interface are detected; In one embodiment, the preset gesture operation is detected, the virtual object in the virtual interface is controlled to perform the preset action, to quickly and accurately control the virtual object at low operation costs and lower a probability of a mis-operation caused by a direction error of a click-press operation because a fault tolerance range of operations is large.

Figure 13:
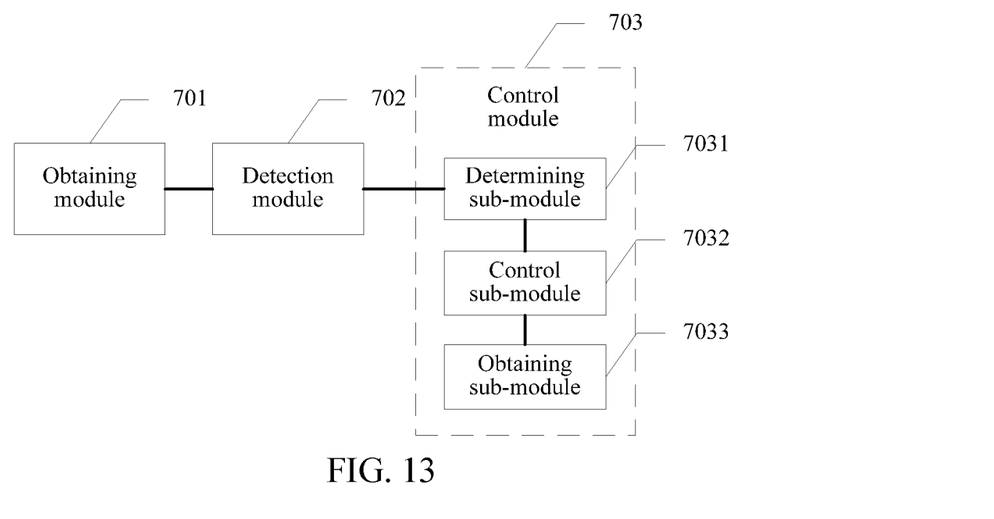
FIG. 13 is a schematic structural diagram of an apparatus for controlling a virtual object according to an example of this application.

Referring to FIG. 13, FIG. 13 shows an apparatus for controlling a virtual object according to an example of this application. For ease of description, only parts related to this example of this application are shown. The apparatus may be built in a mobile terminal and includes: an obtaining module 701, a detection module 702, and a control module 703.

The obtaining module 701 is configured to identify screen areas respectively corresponding to a left virtual sub-interface and a right virtual sub-interface in a virtual interface.

When an application of a racing game is run, parameter information of screen areas of a mobile terminal respectively corresponding to the left virtual sub-interface and the right virtual sub-interface in the virtual interface is loaded, so that the obtaining module 601 obtains the screen areas respectively corresponding to the left virtual sub-interface and the right virtual sub-interface.

The detection module 702 is configured to detect a gesture operation performed in the screen area corresponding to the left virtual sub-interface, and detect a gesture operation performed in the screen area corresponding to the right virtual sub-interface.

The control module 703 is configured to control a virtual object in the virtual interface to perform a preset action when a preset gesture operation is detected in the screen area corresponding to the left virtual sub-interface and the screen area corresponding to the right virtual sub-interface.

The virtual object is an object for performing the preset action in the game. For example, the virtual object is a racing car in a picture.

The preset action may be a drift action of the virtual object or a turning action of the virtual object. The drift action means that the virtual object skids and walks due to excessive turning.

The preset gesture operation may be a preset press gesture, slide gesture, or the like.

The control module 703 is further configured to control the virtual object in the virtual interface to move when an upward or downward slide gesture is detected in the screen area corresponding to the left virtual sub-interface, and a downward or upward slide gesture that is opposite to the gesture is detected in the screen area corresponding to the right virtual sub-interface, a movement direction being a direction of a virtual sub-interface in which the downward slide gesture is located.

Specifically, when the direction in which the downward slide gesture is located is the left virtual sub-interface, the control module 703 controls the virtual object in the virtual interface to move to the left. In one embodiment, the direction in which the downward slide gesture is located is the right virtual sub-interface, the control module 703 controls the virtual object in the virtual interface to move to the right.

Specifically, when the downward slide gesture is detected in the screen area corresponding to the left virtual sub-interface, and the upward slide gesture is detected in the screen area corresponding to the right virtual sub-interface, the control module 703 controls the virtual object in the virtual interface to move to the left.

In one embodiment, the upward slide gesture is detected in the screen area corresponding to the left virtual sub-interface, and the downward slide gesture is detected in the screen area corresponding to the right virtual sub-interface, the control module 703 controls the virtual object in the virtual interface to move to the right.

With reference to FIG. 4, a gesture slide direction of a left hand is downward, and a gesture slide direction of a right hand is upward. With reference to FIG. 5, a gesture slide direction of a left hand is upward, and a gesture slide direction of a right hand is downward.

Further, the control module 703 further includes:

a determining sub-module 7031, configured to confirm a first finger landing point of the first press gesture on the screen and a second finger landing point of the second press gesture on the screen when a first press gesture and a second press gesture are detected in each of the screen area corresponding to the left virtual sub-interface and the screen area corresponding to the right virtual sub-interface;

a control sub-module 7032, configured to control, according to a height difference between respective projections of the first finger landing point and the second finger landing point on a central axis of the screen, the virtual object in the virtual interface to move;

an obtaining sub-module 7033, configured to determine a first height of a projection of the first finger landing point on the central axis of the screen and a second height of a projection of the second finger landing point on the central axis of the screen; and a control sub-module 7032, configured to control the virtual object in the virtual interface to move when a difference between the first height and the second height is greater than a first preset value, control the virtual object in the virtual interface to move to the right when the first height is greater than the second height, and control the virtual object in the virtual interface to move to the left when the second height is greater than the first height; and when the difference between the first height and the second height is less than or equal to the first preset value, skip triggering the virtual object to move, and continuing to perform a current action.

The first preset value may be 20 pixels, or other preset pixels, such as 15 pixels or 25 pixels.

Further, the determining sub-module 7031 is further configured to confirm a first finger landing point corresponding to a start point of the first slide gesture on the screen and a second finger landing point corresponding to a start point of the second slide gesture on the screen when a first slide gesture and a second slide gesture that both indicate upward sliding or downward sliding are detected in each of the screen area corresponding to the left virtual sub-interface and the screen area corresponding to the right virtual sub-interface.

The obtaining sub-module 7033 is further configured to determine a first height of a projection of the first finger landing point on the central axis of the screen and a second height of a projection of the second finger landing point on the central axis of the screen.

The control sub-module 7032 is further configured to control the virtual object in the virtual interface to move when a difference between the first height and the second height is greater than a second preset value, control the virtual object in the virtual interface to move to the right when the first height is greater than the second height, and control the virtual object in the virtual interface to move to the left when the second height is greater than the first height.

The second preset value may be 20 pixels, or other preset pixels, such as 15 pixels or 25 pixels.

Further, the determining sub-module 7031 is further configured to confirm a first finger landing point corresponding to the start point of the slide gesture on the screen and a second finger landing point of the press gesture on the screen when an upward or downward slide gesture is detected in the left virtual sub-interface, and the press gesture is detected in the right virtual sub-interface, or an upward or downward slide gesture is detected in the right virtual sub-interface, and the press gesture is detected in the left virtual sub-interface.

The obtaining sub-module 7033 is further configured to determine a first height of a projection of the first finger landing point on the central axis of the screen and a second height of a projection of the second finger landing point on the central axis of the screen.

The control sub-module 7032 is further configured to control the virtual object in the virtual interface to move when a difference between the first height and the second height is greater than a third preset value, control the virtual object to move to an opposite side of the virtual sub-interface in which the slide gesture is located when the first height is greater than the second height, and control the virtual object in the virtual interface to move to the virtual sub-interface in which the slide gesture is located In one embodiment, the second height is greater than the first height.

Specifically, the determining sub-module 7031 is further configured to confirm a first finger landing point corresponding to the start point of the slide gesture on the screen and confirm a second finger landing point of the press gesture on the screen when an upward slide gesture is detected in the left virtual sub-interface, and the press gesture is detected in the right virtual sub-interface.

The obtaining sub-module 7033 is further configured to determine a first height of a projection of the first finger landing point on the central axis of the screen and obtain a second height of a projection of the second finger landing point on the central axis of the screen.

The control sub-module 7032 is further configured to control the virtual object in the virtual interface to move when a difference between the first height and the second height is greater than a third preset value, and when the first height is greater than the second height, control the virtual object to move to an opposite side of the virtual sub-interface in which the slide gesture is located, that is, move to an opposite side of the left virtual sub-interface, that is, move to the right.

The determining sub-module 7031 is further configured to confirm a first finger landing point corresponding to the start point of the slide gesture on the screen and confirm a second finger landing point of the press gesture on the screen when a downward slide gesture is detected in the left virtual sub-interface, and the press gesture is detected in the right virtual sub-interface.

The obtaining sub-module 7033 is further configured to determine a first height of a projection of the first finger landing point on the central axis of the screen and obtain a second height of a projection of the second finger landing point on the central axis of the screen.

The control sub-module 7032 is further configured to control the virtual object in the virtual interface to move when a difference between the first height and the second height is greater than a third preset value, and when the second height is greater than the first height, control the virtual object to move to the virtual sub-interface in which the slide gesture is located, that is, move to the left virtual sub-interface, that is, move to the left.

The determining sub-module 7031 is further configured to confirm a first finger landing point corresponding to the start point of the slide gesture on the screen and confirm a second finger landing point of the press gesture on the screen when an upward slide gesture is detected in the right virtual sub-interface, and the press gesture is detected in the left virtual sub-interface.

The obtaining sub-module 7033 is further configured to determine a first height of a projection of the first finger landing point on the central axis of the screen and obtain a second height of a projection of the second finger landing point on the central axis of the screen.

The control sub-module 7032 is further configured to control the virtual object in the virtual interface to move when a difference between the first height and the second height is greater than a third preset value, the first height being greater than the second height, control the virtual object to move to an opposite side of the virtual sub-interface in which the slide gesture is located, that is, move to an opposite side of the right virtual sub-interface, that is, move to the left.

The determining sub-module 7031 is further configured to confirm a first finger landing point of the start point of the slide gesture on the screen and confirm a second finger landing point of the press gesture on the screen when a downward slide gesture is detected in the right virtual sub-interface, and the press gesture is detected in the left virtual sub-interface.

The obtaining sub-module 7033 is further configured to determine a first height of a projection of the first finger landing point on the central axis of the screen and obtain a second height of a projection of the second finger landing point on the central axis of the screen.

The control sub-module 7032 is further configured to control the virtual object in the virtual interface to move when a difference between the first height and the second height is greater than a third preset value, and when the second height is greater than the first height, control the virtual object to move to the virtual sub-interface in which the slide gesture is located, that is, move to the right virtual sub-interface, that is, move to the right.

The third preset value may be 20 pixels, or other preset pixels, such as 15 pixels or 25 pixels.

For technical details that are not described in one embodiment consistent with the present disclosure, the details in the examples shown in FIG. 3 to FIG. 12 are not described herein again.

In one embodiment consistent with the present disclosure, the virtual interface is divided into the left virtual sub-interface and the right virtual sub-interface; gesture operations performed in the screen areas corresponding to the left virtual sub-interface and the right virtual sub-interface are detected; when the preset gesture operation is detected, the virtual object in the virtual interface is controlled to perform the preset action, to quickly and accurately control the virtual object at low operation costs and lower a probability of a mis-operation caused by a direction error of a click-press operation because a fault tolerance range of operations is large.

Figure 14:
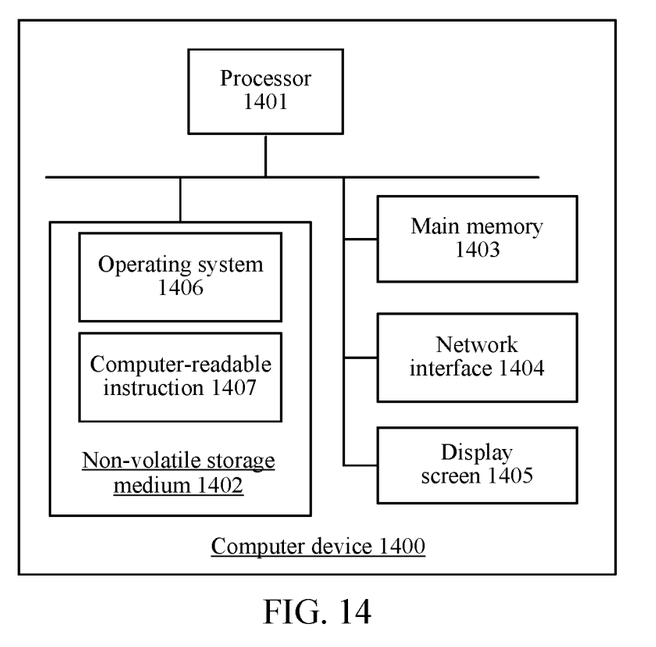
FIG. 14 is a schematic structural diagram of a device according to an example of this application.

FIG. 14 is a diagram of an internal structure of a computer device according to an example of this application.

As shown in FIG. 14, the computer device 1400 includes a processor 1401, a non-volatile storage medium 1402, a main memory 1403, a network interface 1404, and a display screen 1405 that are connected to each other by using a system bus. The non-volatile storage medium 1402 of the computer device 1400 may store an operating system 1406 and a computer-readable instruction 1407. When being executed, the computer-readable instruction 1407 may cause the processor 1401 to perform a method for controlling a virtual object. The processor 1401 is configured to provide computation and control capability, to support operation of the whole computer device. The computer-readable instruction 1407 may be stored in the main memory 1403. When being executed by the processor 1401, the computer-readable instruction 1407 may cause the processor 1401 to perform a method for controlling a virtual object. The network interface 1404 is configured to perform network communication with a server, for example, transmit a collaborative operation authorization request to a server and receive an authorization response returned by the server. A display screen of the computer device 1400 may be a liquid crystal display screen or an electronic ink display screen. The computer device 1400 may be a mobile phone, a tablet computer, a personal digital assistant, or a wearable device. A person skilled in the art may understand that, the structure shown in FIG. 14 is merely a block diagram of a partial structure related to a solution in this application, and does not constitute a limitation to the computer device to which the solution in this application is applied. Specifically, the computer device may include more components or fewer components than those shown in the figure, or some components may be combined, or a different component deployment may be used.

An example of this application further provides a computer-readable storage medium, storing a computer-readable instruction, when executed by a processor, the computer-readable instruction causing the processor to perform any example in the foregoing method.

In the several examples provided in this application, it is to be understood that the disclosed method and apparatus may be implemented in other manners. For example, the described apparatus examples are merely exemplary. For example, division of the modules is merely logical function division and may be other division manners during actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all modules thereof may be selected based on an actual requirement, to implement an objective of the solution in this example.

In addition, functional modules in the examples of in this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the related technology, or all or some of the technical solutions may be implemented in the form of a software product. The software product is stored in a storage medium and includes several instructions for instructing a computer device (which may be a personal computer, a server, or a network device) to perform all or some of the steps of the methods described in the examples of this application. The foregoing storage medium includes: any medium that can store program code, such as a USB flash memory drive, a removable hard disk, a read-only memory (ROM), a random access memory (RAM), a magnetic disk, or an optical disc.

For brief description, the foregoing method examples are represented as a series of actions. However, a person skilled in the art should appreciate that this application is not limited to the described order of the actions, because according to this application, some steps may be performed in other orders or simultaneously. It is to be further appreciated by a person skilled in the art that the examples described in this specification all belong to preferred examples, and the actions and modules are not necessarily required by this application.

In the foregoing examples, the description of each example has respective focuses. For a part that is not described in detail in an example, reference may be made to related descriptions in other examples.

Descriptions of the method for controlling a virtual object and the apparatus for controlling a virtual object provided in this application are provided above. A person skilled in the art may make modifications to the specific implementations and application scopes according to the ideas of the examples of this application. To conclude, the content of the specification should not be construed as a limitation to this application.

What is claimed is:

1. A method of controlling a virtual object, performed by a terminal device, the method comprising:
   identifying a left sub-interface and a right sub-interface on a screen of the terminal device;
   detecting a first gesture operation received at the left sub-interface and a second gesture operation received at the right sub-interface;
   identifying a first finger landing point corresponding to the first gesture operation and a second finger landing point corresponding to the second gesture operation;
   determining a height difference between a first projection height of the first finger landing point relative to a central axis of the screen and a second projection height of the second finger landing point relative to the central axis of the screen;
   in response to determining the height difference is greater than a preset height value, causing the virtual object to move on the screen according to the height difference; and
   in response to determining the height difference is smaller than or equal to the preset height value, causing the virtual object to stay and not to move on the screen.

2. The method of claim 1, wherein the first gesture operation is detected at a first timepoint and the second gesture operation is detected at a second timepoint, the method further comprising:
   in response to determining a time difference between the first timepoint and the second timepoint is smaller than a preset time value and in response to determining the height difference is greater than the preset height value, causing the virtual object to move on the screen according to the height difference; and
   in response to determining the time difference between the first timepoint and the second timepoint is greater than or equal to the preset time value, causing the virtual object to stay and not to move on the screen.

3. The method of claim 1, wherein the height difference is a value in pixels.

4. The method of claim 1, wherein the first gesture operation and the second gesture operation each include a press operation.

5. The method of claim 1, wherein the first gesture operation and the second gesture operation each include a slide operation.

6. The method of claim 1, wherein the first gesture operation includes a slide operation while the second gesture operation includes a press operation, or wherein the first gesture operation includes a press operation while the second gesture operation includes a slide operation.

7. An apparatus for controlling a virtual object, the apparatus comprising: a memory storing computer program instructions executable by a processor; and a processor coupled to the memory, and being configured to execute the computer program instructions and perform:
   identifying a left sub-interface and a right sub-interface on a screen of the terminal device;
   detecting a first gesture operation received at the left sub-interface and a second gesture operation received at the right sub-interface;
   identifying a first finger landing point corresponding to the first gesture operation and a second finger landing point corresponding to the second gesture operation;
   determining a height difference between a first projection height of the first finger landing point relative to a central axis of the screen and a second projection height of the second finger landing point relative to the central axis of the screen;
   in response to determining the height difference is greater than a preset height value, causing the virtual object to move on the screen according to the height difference; and
   in response to determining the height difference is smaller than or equal to the preset height value, causing the virtual object to stay and not to move on the screen.

8. The apparatus of claim 7, wherein the first gesture operation is detected at a first timepoint and the second gesture operation is detected at a second timepoint, and wherein the processor is further positioned to perform:
- in response to determining a time difference between the first timepoint and the second timepoint is smaller than a preset time value and in response to determining the height difference is greater than the preset height value, causing the virtual object to move on the screen according to the height difference; and
- in response to determining the time difference between the first timepoint and the second timepoint is greater than or equal to the preset time value, causing the virtual object to stay and not to move on the screen.

9. The apparatus of claim 7, wherein the first gesture operation and the second gesture operation each include a press operation.

10. The apparatus of claim 7, wherein the first gesture operation and the second gesture operation each include a slide operation.

11. The apparatus of claim 7, wherein the first gesture operation includes a slide operation while the second gesture operation includes a press operation, or wherein the first gesture operation includes a press operation while the second gesture operation includes a slide operation.

12. The apparatus of claim 7, wherein the first or the second gesture operation includes a click operation.

13. A non-transitory computer-readable storage medium storing computer program instructions executable by a processor to perform:
- identifying a left sub-interface and a right sub-interface on a screen of the terminal device;
- detecting a first gesture operation received at the left sub-interface and a second gesture operation received at the right sub-interface;
- identifying a first finger landing point corresponding to the first gesture operation and a second finger landing point corresponding to the second gesture operation;
- determining a height difference between a first projection height of the first finger landing point relative to a central axis of the screen and a second projection height of the second finger landing point relative to the central axis of the screen;
- in response to determining the height difference is greater than a preset height value, causing the virtual object to move on the screen according to the height difference; and
- in response to determining the height difference is smaller than or equal to the preset height value, causing the virtual object to stay and not to move on the screen.

14. The non-transitory computer-readable storage medium of claim 13, wherein the first gesture operation is detected at a first timepoint and the second gesture operation is detected at a second timepoint, and wherein the computer program instructions are further executable by the processor to perform:
- in response to determining a time difference between the first timepoint and the second timepoint is smaller than a preset time value and in response to determining the height difference is greater than the preset height value, causing the virtual object to move on the screen according to the height difference; and
- in response to determining the time difference between the first timepoint and the second timepoint is greater than or equal to the preset time value, causing the virtual object to stay and not to move on the screen.

15. The non-transitory computer-readable storage medium of claim 13, wherein the first gesture operation and the second gesture operation each include a press operation.

16. The non-transitory computer-readable storage medium of claim 13, wherein the first gesture operation and the second gesture operation each include a slide operation.

17. The non-transitory computer-readable storage medium of claim 13, wherein the first gesture operation includes a slide operation while the second gesture operation includes a press operation, or wherein the first gesture operation includes a press operation while the second gesture operation includes a slide operation.

* * * * *